United States Patent [19]
Müller et al.

[11] Patent Number: 4,574,211
[45] Date of Patent: Mar. 4, 1986

[54] BRUSHLESS D.C. MOTOR

[75] Inventors: Rolf Müller, St. Georgen; Reinhold Wurdak, Furtwangen, both of Fed. Rep. of Germany

[73] Assignee: Papst-Motoren GmbH & Co. KG, St. Georgen, Fed. Rep. of Germany

[21] Appl. No.: 391,145

[22] Filed: Jun. 23, 1982

[30] Foreign Application Priority Data

Jun. 30, 1981 [DE] Fed. Rep. of Germany ....... 3125694

[51] Int. Cl.$^4$ ............................................. H02K 11/00
[52] U.S. Cl. ................................ 310/68 R; 310/67 R; 310/156; 318/254
[58] Field of Search ........... 310/68 R, 63, 68 B, 68 C, 310/152, 156; 318/138, 254, 254 A

[56] References Cited

U.S. PATENT DOCUMENTS

| | | | |
|---|---|---|---|
| 3,969,644 | 7/1976 | Nowak | 310/152 |
| 4,086,519 | 4/1970 | Persson | 318/254 A |
| 4,099,104 | 7/1978 | Müller | 318/254 A |
| 4,143,288 | 3/1979 | Sato | 310/68 |
| 4,217,508 | 8/1980 | Uzuka | 310/67 X |
| 4,286,184 | 8/1981 | Kögler et al. | 318/254 X |

Primary Examiner—Donovan F. Duggan
Attorney, Agent, or Firm—Frishauf, Holtz, Goodman & Woodward

[57] ABSTRACT

The permanent magnet rotor of a brushless d.c. motor is provided with regions of reduced magnetization in the mid-portion of the poles and spaced from the pole gaps, these regions being offset towards the extremity of the rotor where a portion of the rotor extending beyond the air gap of the motor serves to control a Hall I C sensor for control of the current in the stator windings. The regions of reduced magnetization do not interfere with the rapid switching of the Hall I C, but in a cylindrical air gap motor reduce the axial thrust on the rotor resulting from the asymmetric extension of the rotor out of the air gap which is provided for commutation control. Since this thrust is of a pulsating character, its reduction is important and permits simpler bearings to be used for the rotor shaft. Apart from reducing the axial thrust, the pattern of magnetization above described reduces non-uniformity in the current flow in the windings and therefore also variation in torque during a revolution of the motor. The latter advantages are also obtainable with flat air gap motors.

24 Claims, 13 Drawing Figures

BRUSHLESS D.C. MOTOR

This invention concerns a brushless d.c. motor, particularly a brushless d.c. motor of compact and economic structure that is useful for operating a ventilating fan in electronic apparatus and in other services that may require long running time at light load and low cost. Examples of known motors for such service are the motor described in German published patent application (OS) No. 25 14 067 and motors described in U.S. Pat. Nos. 4,099,104 and 4,030,005.

In axial (cylindrical) air-gap motors of this sort, it is desirable for the permanent magnet rotor to extend beyond the air gap across which it faces the stator so as to provide a portion of the rotor that will control a sensor which in turn controls the furnishing of pulses to the stator coils. When the air gap is cylindrical, there results an axial force on the rotor unless there is an otherwise useless extension of the rotor at the other end of the stator, and that force puts a load on the bearings of the motor. In both cylindrical and flat air-gap motors, conventional magnetization patterns provided for the rotor provide undesirable dips and peaks in the wave profile of the current pulses in the stator, as the result of counter-EMF effects.

THE INVENTION

It is an object of the invention to provide a smoothing out of the current wave in the stator, both in cylindrical-gap (axial-gap) and flat-gap (radial-gap) motors. It is also an object of the invention to improve motors of the brushless d.c. type, especially when the air-gap is cylindrical, so that the sensor can be efficiently operated without requiring undue increase in the size of the motor, undue expense in the bearings or other disadvantages. Finally, it is another object of the invention to provide a simple method and apparatus for magnetizing the rotor with a pattern of magnetization appropriate for the obtaining of the other objects of the invention.

Briefly, the current wave shape of pulses in the stator is smoothed out by the magnetization of the rotor in a pattern by which the induction effect of the rotor on the winding of the stator is reduced in the midportion of the magnetic poles of the rotor by comparison to the boundary regions of the magnetic poles adjoining the interpole gaps. In other words, the magnetization in these mid-portions is weaker than in the portions of the poles adjacent the interpole gaps. This pattern of magnetization of the rotor does not need to cover the entire portion of the rotor facing the air gap and preferably covers only a part of that portion of the rotor.

In an axial (cylindrical) air-gap rotor, the aforesaid pattern of magnetization is imposed on the portion of the rotor extending beyond the stator for control of the sensor, and the magnetization in this region conforms with that in the rest of the rotor with regard to the polarity of the poles and the location of the interpole gaps. With such an arrangement in an axial-gap motor, it is not necessary to have an extension of the rotor at the other end of the stator beyond the air gap that is of the same order of magnitude as the extension of the rotor serving the sensor, while still avoiding any undesirably large pulsating force in the axial direction acting on the rotor. A precise commutation of the stator current at the correct rotor positions and the reliable control of these currents with respect to rotor position is still preserved. Such an axial-gap motor can also operate satisfactorily when an external axial force operates on the rotor, as in the case when the motor drives an axial fan. In such a case, no great stress is applied to the bearings of the rotor, and it is possible to use sleeve bearings. In this, as well as in other embodiments of the invention, a highly favorable form of the induced voltage wave, the so-called counter-EMF, is obtained and thus a favorable form of the current wave, resulting in very little fluctuation of torque.

The regions of weaker magnetization in the mid-portions of the poles can be provided by varying the strength of the magnetization of the permanent magnet material of the rotor or by removing or not supplying magnetizable material for part of the thickness of the rotor in those regions. These regions may extend out to the edge of the rotor magnet or they may be in the configuration of islands. These regions occupy between 10% and 90% of the total magnetizable surface of the portion of the rotor extending beyond the air gap for cooperation with the sensor, and preferably between 40% and 60% of that surface area.

It is particularly convenient to provide the rotor with a pot-shaped external rotor part, with the portion of the rotor magnet extending beyond the air gap for cooperation with the sensor extending towards the rim of the pot-shaped part.

This invention also involves the provision of a method and apparatus for magnetizing the rotor magnet in a pattern for providing a motor according to the invention.

The magnetizing apparatus involves a ferromagnetic structure, of a shape for fitting the rotor to be magnetized, and equipped with a winding for which it acts as a magnetic core. The ferromagnetic structure has cavities facing regions of the rotor which are to be provided with weaker magnetization than the regions adjacent to the interpole gaps. This apparatus is particularly effective if these cavities are filled in whole or in part with a conducting material, for example copper. The desired effect is aided if at least some of the turns of the winding in the neighborhood of these cavities have loops entering into these cavities. With such an apparatus, the desired pattern of magnetization can be obtained simply by providing a magnetizing current through the winding of the apparatus when the rotor is in position for being magnetized.

It is also possible to provide the desired magnetization of the rotor by the method of first providing magnetization of the now conventional type, namely, a magnetization having a profile, in a direction running perpendicular to the pole gaps, of the shape of a trapezoidal wave with steep transition portions corresponding to the pole gaps. Then, as a second step, the regions of weaker magnetization are produced by partial local demagnetization in an apparatus designed to provide demagnetization in the appropriate regions.

The invention is also applicable to improve the operation of brushless d.c. motors utilizing a flat air gap, although in this case there is no problem of dealing with axial thrust or control of sensors, and it is rather a question of obtaining a more favorable shape of the current pulses in the stator winding during operation of the motor.

BRIEF DESCRIPTION OF THE DRAWINGS

The invention is further described by way of illustrative example with reference to the annexed drawings, in which.

DESCRIPTION OF THE ILLUSTRATED EMBODIMENT

Figure 1:
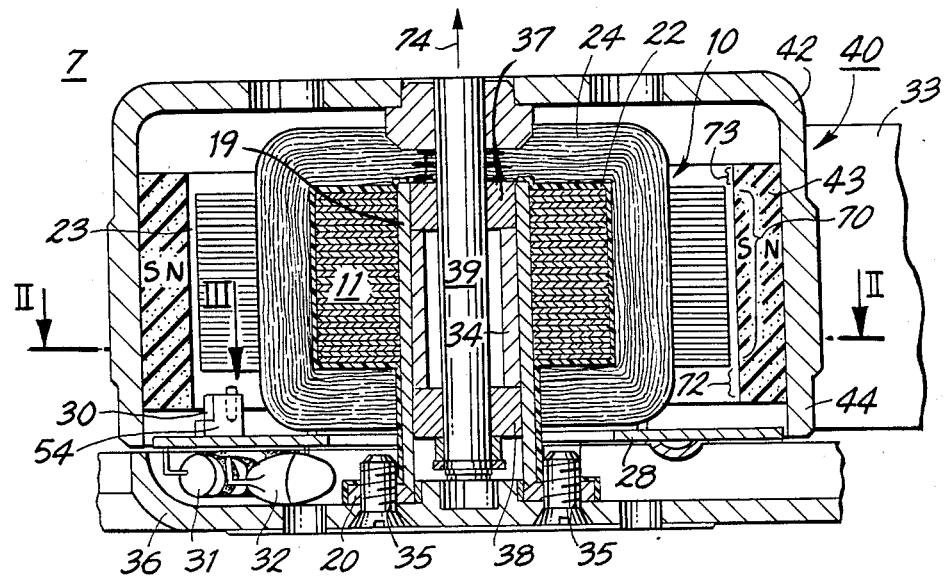
FIG. 1 is a section, along a plane passing through the axis, of a two-pulse d.c. brushless motor serving to energize a blower which is only partly indicated in the drawings.
Figure 2:
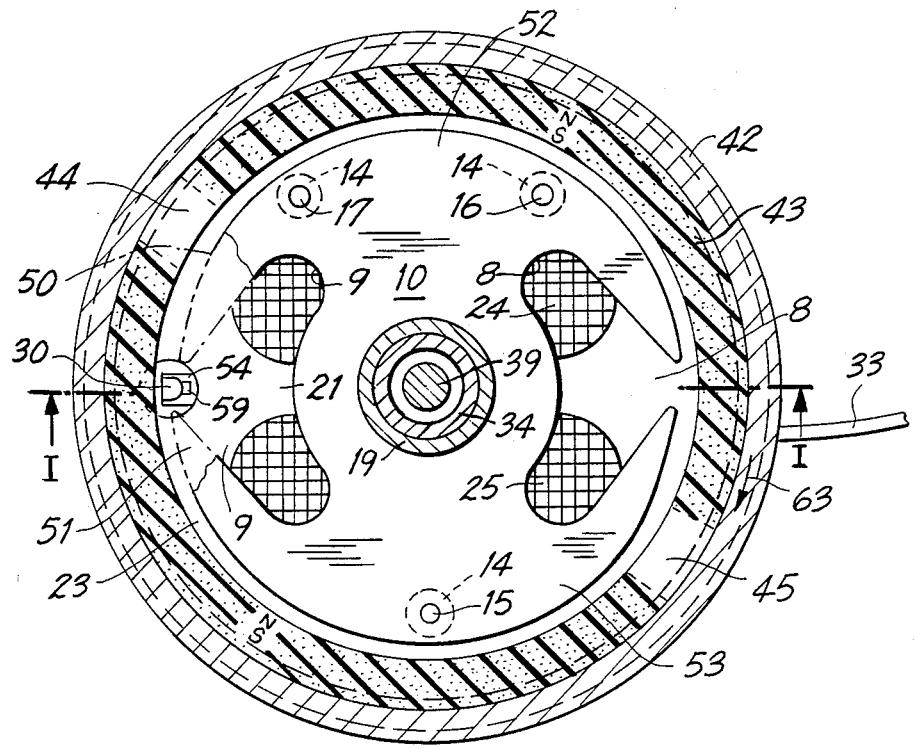
FIG. 2 is a section of the motor of FIG. 1 on a plane passing through the line II—II of FIG. 1, FIG. 2 showing the section line I—I through which the section of FIG. 1 passes.
Figure 3:
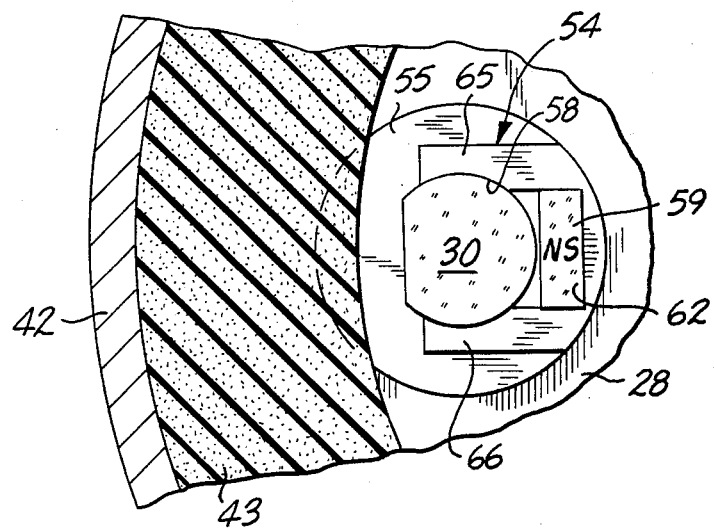
FIG. 3 is a detail of FIG. 2 on a larger scale viewed in the direction of the arrow III of FIG. 1.
Figure 4:
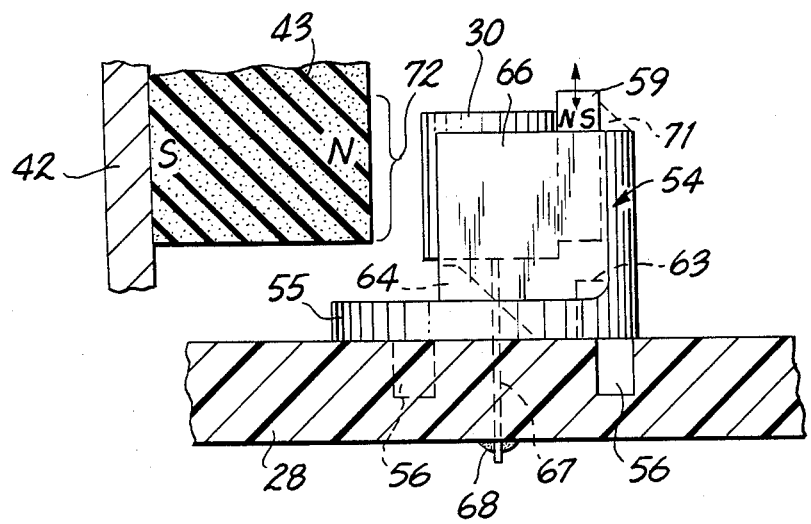
FIG. 4 is a side view, partly in section, corresponding to FIG. 3.

FIGS. 1 and 2 show a brushless d.c. motor 7 which is of the so-called two-pulse type, meaning that the stator coils are provided with two pulses per 360° el. of revolution of the rotor. The motor comprises an internal stator 10 having a core in the form of a lamination stack 11 which in the illustrated case has laminations cut to a shape described in detail in German Pat. No. 23 46 380 and in U.S. Pat. No. 4,030,005, with particular reference to the shape of the air gap 23. This cut of the laminations is suited for operation with a trapezoidal magnetization of the rotor, such as is further described below in connection with FIG. 6. The illustrated motor is an external rotor motor; the invention can, however, be practiced also in the case of internal rotor motors and, in fact, it can be practiced with four-pulse motors and motors of other pulse counts per 360° el. of revolution just as well as with two-pulse motors. In fact, some benefits of the invention are obtainable even with a motor using a flat air gap rather than cylindrical air gap, as discussed below in connection with FIG. 13.

As shown in FIGS. 1 and 2, the lamination stack 11 is held together by three pins 15, 16 and 17, each having a thicker portion, as for example a rivet head 14. The stack has a central cavity in which a bearing support tube 19 is pressed in, which has a fastening flange 20 at one end (the bottom end in FIG. 1). In the slots 8 and 9 of the lamination stack 11, two stator windings 24 and 25 are wound which, as shown, do not mutually overlap each other, so that a small axial height of the motor results and a winding-free space 21 is provided between the windings in each of the slots 8 and 9.

At the lower end of the rivet pins 15, 16 and 17, a circuit board 28 of a suitable insulating material is affixed. It is provided with a printed circuit to which the leads of the stator windings 24 and 25 are directly connected. This circuit board also carries the entire electric circuit for controlling the currents in the windings 24 and 25. These currents are commutated in a manner dependent upon rotor position by means of a sensor 30 carried on the circuit board 28, which is preferably a galvanomagnetic sensor, as for example the Hall integrated circuit (Hall IC) illustrated in FIGS. 1,2,3 and 4. FIG. 1 shows schematically two electronic components 31 and 32 which are soldered into place on the circuit board 28 representing the various circuit components necessary for the control circuit. Control circuits for two-pulse motors are well known and are described, for example, in U.S. Pat. Nos. 4,030,005 and 4,230,976, incorporated herein by reference.

The stator assembly is mounted on a motor carrier base or bracket 36 by its flange 20 with screws 35. The motor support 36 may, for example, be the spider bracket of a conventional axial blower for the ventilation of electronic apparatus. Such a blower has vanes attached to the rotor of its motor, one of these being schematically shown in part at 33.

The representations in FIGS. 1 and 2 are enlarged. Normally such axial blowers have a prescribed height of only 38 mm.

In the bearing support tube 19, a rotor shaft 39 is journaled in two sleeve bearings 37 and 38 between which an oil supply felt 34 is disposed, so that lubrication can be provided to the bearings by capillary action. At the upper end of the rotor shaft 39, a deep-drawn soft iron rotor bell 42 is affixed, which is the carrying member for the external rotor of the motor. This cup-shaped member is open downwards and overlaps the stator 10 so as to surround it. Reference is made to British Pat. No. 1 324 830 for an advantageous configuration of the bearing.

A continuous annular rotor magnet 43 is mounted inside the rotor bell 40. This rotor magnet is radially magnetized in a two-pole pattern indicated by the letters N (=North Pole) and S (=South Pole). The pole gaps 44, 45, where there is the transition from magnetization of one polarity to magnetization of the other polarity, are narrow in the rotor magnet 43.

The Hall IC 30 is located in the intermediate space between the stator windings 24 and 25, near the left-hand pole points 50 and 51 shown in FIG. 2, thus between the stator poles 52 and 53. The pole points 50 and 51 bound and almost close off, as shown, the left-hand slot 9 of the lamination stack and together define a relatively narrow slot opening for introducing the stator windings 24 and 25 in maufacture of the motor. As clearly appears in FIG. 2, the stator 10 is symmetrical with respect to its center.

The Hall IC 30 is fitted into a molded plastic part 54 that is affixed to the circuit board 28. It is shown in more detail in FIGS. 3 and 4 and has approximately the shape of an armchair, the well-known form of an upholstered wing-chair. It has a base plate 55 of circular contour from which downward extensions 56 projects into corresponding perforations of the circuit board 28 or of some other carrier piece so as to fix the position of the plastic mounting piece 54. A structure 57 extends upwards from the base plate 55 having a cavity for precisely fitting and holding the Hall IC 30 and a permanent magnet insert 59. The latter is shiftable in a guide channel 62 that is provided with a stop 63 at the bottom. A spacer 64 determines the spacing between the underside of the Hall IC 30 and the base plate 55. The two side cheeks 65 and 66, between which the Hall IC 30 is mounted, have a little spring action and thereby hold the Hall IC 30 securely. The Hall IC 30 has wire leads 67 extending downward below it, only one of these being visible in FIG. 4. These leads are soldered to conducting paths of the circuit board 28 as shown at 68, and both the Hall IC 30 and the plastic molding piece 54 are thereby secured to the circuit board 28. The permanent magnet piece 59 is fixed into position by means of a drop 71 of adhesive. This permanent magnet serves for adjusting the symmetry of the motor, a matter of which reference is made to German published patent application (OS) No. 31 11 387, corresponding to U.S. patent application Ser. No. 361,059 filed Mar. 23, 1982, owned by the Assignee of this application, and incorporated herein by reference.

For correct control of the Hall IC 30, a certain magnet flux density of the rotor magnet 43 is required, i.e., the axial extension region 72 of the rotor magnet 43, which extends beyond the stator lamination stack 11 in the downward direction, must have a certain minumum length, e.g., from 5 to 10 mm. On the other axial end of the rotor magnet, however, the axial extension region 73 can be shorter, because there, a longer extension has no utility, while it wastes costly material. The portion of the rotor magnet 43 that is opposite the stator lamination stack 11 is designated 70 in FIG. 1.

The different size of the axial extension regions 72 and 73 has the result that the rotor is subject to an upward thrust 74 (FIG. 1), because the rotor magnet 43 tends to place itself symmetrically to the stator lamination stack 11. This upward thrust 74, moreover, is of a magnitude that depends upon rotary position, because, as shown in FIG. 2, the air gap 23 is not the same all around, as explained in U.S. Pat. No. 4,030,005, where the air gap shape is explained in detail.

When such a motor is used in a blower, this thrust 74 operates against a counter-thrust from the fan blades 33 and if these thrusts are of about the same size, noticeable and very disturbing axial vibrations can result. For reducing or eliminating this disturbing phenomenon, a special magnetization of the rotor magnet 43 is used in accordance with the invention, as is illustrated by way of example in FIG. 5 and 6. Other patterns of magnetization fulfilling the same objectives are also described below.

Figure 5:
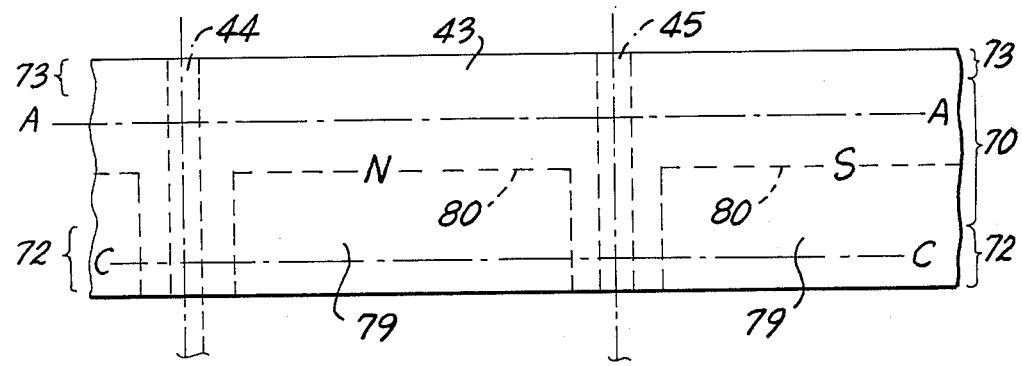
FIG. 5 is a developed view of the rotor magnet of the motor of FIGS. 1-4.

FIG. 5 shows the rotor magnet 43 in developed representation. The pole gaps 44 and 45, which are parallel to the axis as shown, but could also be skewed, are the same from top to bottom, and magnetization adjacent to the pole gaps is likewise the same from top to bottom of the rotor.

Figure 6:
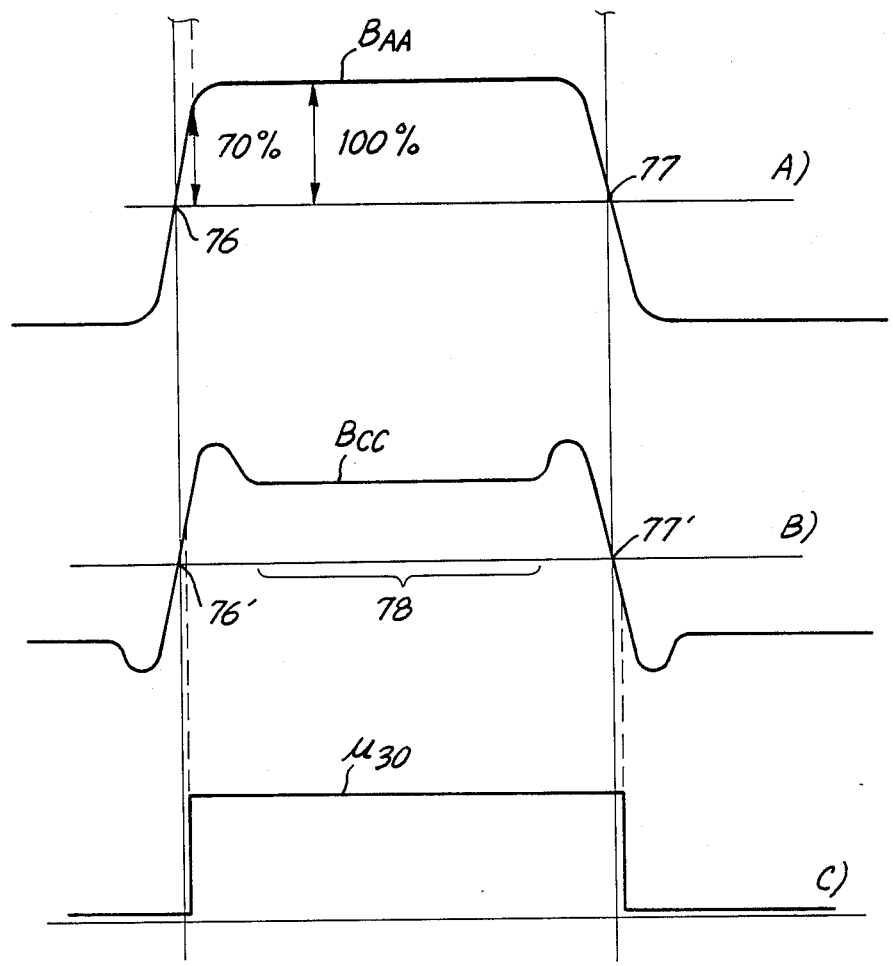
FIG. 6 is a group of graphical representations on the same horizontal scale of the magnetic flux density measured on the line A—A of FIG. 5, the same corresponding to a line C—C of FIG. 5 and, finally, the output voltage of the sensor when subject to the latter pattern of flux density.

The magnetization in the upper part of the rotor, for example along the line A—A, is trapezoidal (as shown in the top graph of FIG. 6, identified A). This means that in a region of about 170° electrical, the magnetic flux density $B_{AA}$ is practically constant and falls off steeply in the region of the pole gaps, so that steep null transitions are provided at 76 and 77. The magnetization in the upper extension region 73 is the same as in the upper part of the region 70 already described with reference to the line A—A of FIG. 5. In the lower part of the region 70 of the magnet rotor and in the lower extension region 72 of the magnet extending beyond the air gap, the magnetization is as shown for the line C—C of FIG. 5 in the middle graph of FIG. 6, designated B.

In this different type of magnetization, the null transitions 76' and 77' are exactly the same in position and form as in the case of the transitions 76 and 77, i.e., the magnetic flux density $B_{CC}$ in this region changes very sharply within a small angle of rotation. This is important for a precise switching over of the Hall IC 30 as near as possible to these null transitions 76' and 77'. Hall IC's with digital output signals have a switching hysteresis. A high gradient of the flux density therefore promotes a precise switching at the desired instant.

In the middle region 78 (FIG. 6, second graph) between the null transitions 76' and 77', the flux density $B_{CC}$ is reduced, however, e.g., by 10 to 40% and preferably by about 20 to 30% compared to the maximum value. This reduction has no effect on the output signal $u_{30}$ of the Hall IC 30, as shown in the bottom graph of FIG. 6, because in this case the sign of the magnetic flux density does not change, and the Hall IC 30 has only two possible switching conditions at its output, namely high and low. The invention, however, could also be applicable for a galvanomagnetic sensor with an analog output rather than a digital one, because even there a certain dip of the output signal in the mid-region 78 causes no trouble if the circuit is correspondingly designed, e.g. if the analog Hall signal controls a comparator that has a hysteresis. This reduction of the flux density $B_{CC}$ takes place in every case for a region 79, the boundaries of which are designated 80 in FIG. 5 and which extends about to the middle of the rotor magnet 43, and thus covers the axial extension region 72 and a part of the motor (air gap) region 70 of the magnet.

Since the force with which a magnet is attracted by a piece of soft iron rises approximately with the square of the magnet flux density, the reduction of the magnetic flux density in the regions 79 by about 30%, thus to 70% of the maximum value, cuts the magnetic thrust 74 in the axial direction about in half ($0.7^2 = 0.49$). Otherwise stated, the lower extension region 72, constituted in accordance with the invention, acts as if it were much narrower, so that the axial thrust 74 is now smaller and therefore can be dealt with very well, even when sleeve bearings 37 and 38 are used.

Figure 9:
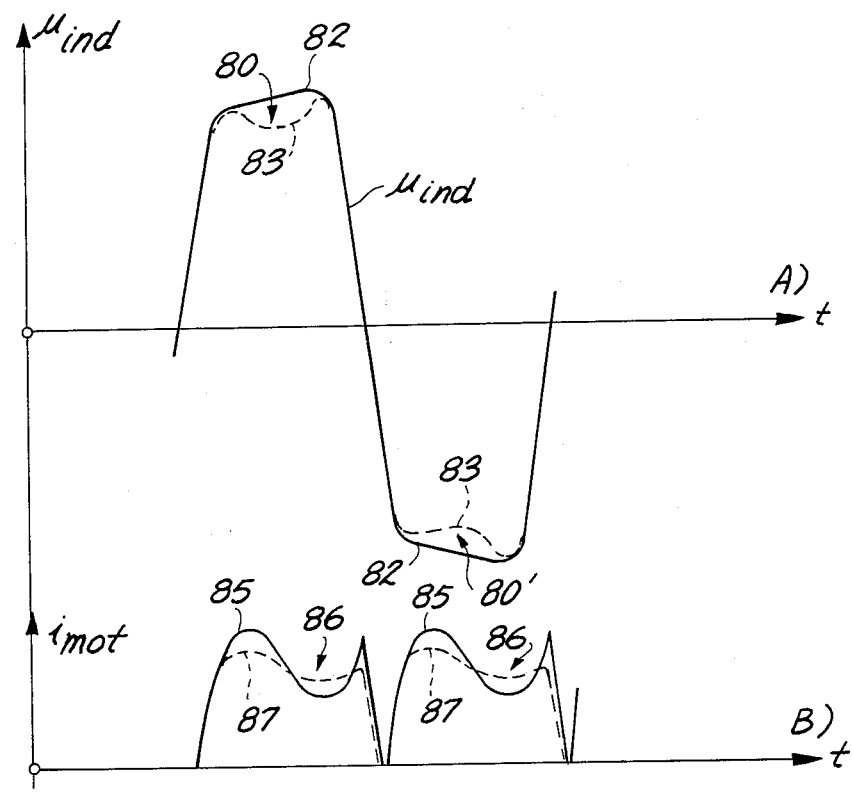
FIG. 9 is a graphical representation of the induced voltage and of the resulting motor current showing the effect of the invention.

Quite independent of the question of the magnetic thrust on the rotor shaft, the invention brings forth a significant advantage in the behavior of the motor. FIG. 9 shows, on the upper graph designated A, the course of the induced voltage $u_{ind}$, thus the voltage which is induced in the stator windings 24 and 25 when the motor has no current flowing therein and the rotor 40 is driven externally. The voltage that is obtained when the invention is not used, which is to say when the entire rotor is magnetized in the manner shown in the top of graph (A) of FIG. 6, is shown in solid lines. This voltage is more or less trapezoidal, but with an inclined roof. The voltage that is obtained in the practice of the invention is shown in broken lines 83. This voltage wave dips in the middle of the wave in the regions 79 of reduced magnetic flux density, i.e., the roof portions of the trapezoids have small dips or saddles at 80 for the positive half-wave and at 80' for the negative half-wave.

As shown in the bottom graph, designated (B), of FIG. 9, these saddles 80, 80' have a significant and much desired effect on the current in the stator windings 24 and 25. Without the use of the invention, the current n wave 85, shown in solid lines, is obtained, which has at 86 a deep saddle which is undesired, because it reduces the power of the motor 7 and produces a non-uniform torque. In broken lines at 87, the top of the current wave according to the invention is shown and here, in contrast to the solid line wave shape, these saddles are substantially weaker and as a result a much more favorable course of current is obtained, with the current rising to less high values, both on the rise and also shortly before switching off, while maintaining overall about the same average value of current and therefore also the same drive power. It is also evident that with the practice of the invention the torque fluctuations are less strong, which is highly advantageous. The disappearance of the undesired current spikes or peaks just before switching off is also of great significance, because it is favorable for the transistors that switch the currents illustrated in the graph (B) of FIG. 9. This means that transistors are less heavily loaded or stressed.

Figure 7:
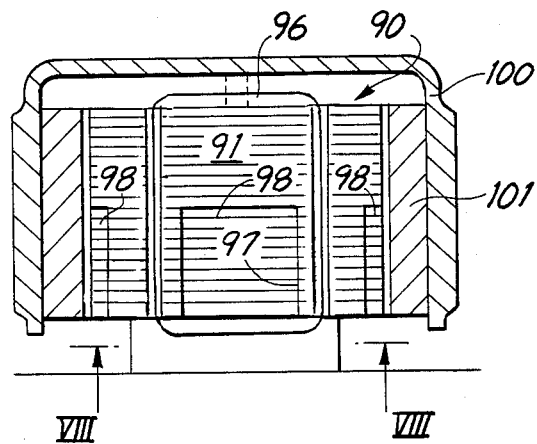
FIG. 7 is a side elevation, partly in section, of a magnetizing device for magnetizing a four-pole rotor for a motor according to the invention.
Figure 8:
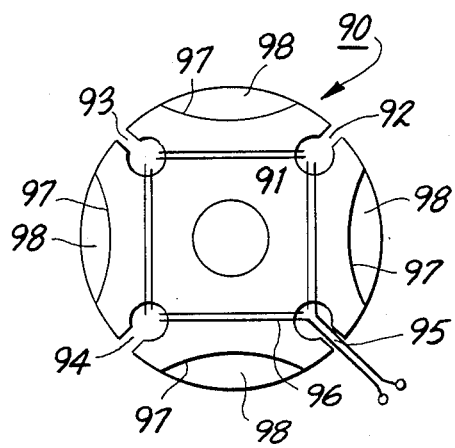
FIG. 8 is a plane view of the device of FIG. 7 seen as indicated by the arrows VIII—VIII of FIG. 7.

FIGS. 7 and 8 illustrate, by way of example, a magnetizing device 90, in this case for magnetizing a four-pole rotor. (The rotor 40 illustrated in FIGS. 1 and 2 is a two-pole rotor.) The magnetizing device shown in these figures has a lamination stack 91 provided with four slots 92,93,94 and 95. in which passes a winding 96, as shown, that is so wound that when current flows therethrough, alternative north and south poles are produced around the periphery of the lamination stack 91.

The lamination stack 91 is externally cylindrical, but in the places where the regions 79 of reduced magnetic flux density are to be produced, lateral cavities 97 are provided which as shown have a substantially cylindrical contour, but do not extend in the circumferential direction up to the slots 92–95. The radii of the concave cylindrical surfaces of the cavities 97 in the illustrated case correspond at least approximately to the radius of the lamination stack 91, so that the cavities 97 are lens shaped in cross-section. These cavities 97 are filled with correspondingly lens shaped copper pieces 98.

The rotor 100 which is to be magnetized and its rotor magnet 101 are shown schematically in FIG. 7 in the corresponding position for magnetization. When it is so located, a brief direct current pulse is forced through the winding 96, and the magnet 101 then receives the desired magnetization. While this is done, eddy currents are produced in the lens shaped copper pieces 98 which press the magnetic flux lines out of these copper pieces and thereby produce the reduction of the magnetic flux density in the regions of the rotor magnet 101 opposite these copper pieces.

Of course, the device of FIGS. 7 and 8 can readily be modified for magnetizing a two-pole rotor, such as the rotor shown in FIGS. 1 and 2.

Figure 10:
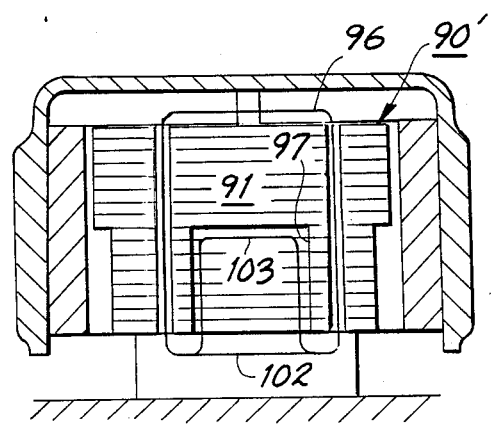
FIG. 10 is side elevation, partly in section, of a modified form of a magnetizing device of FIGS. 7 and 8.

FIG. 10 shows a modification of the magnetizing device of FIGS. 7 and 8. Parts which are the same or have the same function as in FIGS. 7 and 8 are designated with the same reference numerals as in those figures.

The winding 96 here consists of a number of windings. In the cavities 97, no copper pieces are provided in this case, but rather a part 102 of the winding 96 is passed around the outside of the pole, as in FIG. 7, and another part 103 is looped inward around the cavities 97. Consequently, the magnetic flux density upon magnetization, is reduced in the cavities 97, so that the rotor magnet 101 is less strongly magnetized at the locations facing these cavities.

Figure 11:
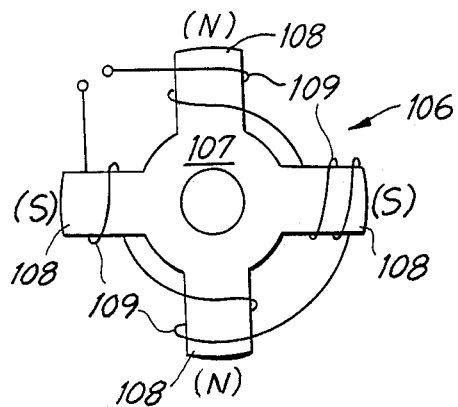
FIG. 11 is a basic diagram of a demagnetizing device for demagnetizing island regions of an external-rotor magnet in accordance with the invention.

FIG. 11 shows in highly schematic fashion another alternative, in this case a demagnetizing device 106 for partly demagnetizing predetermined regions of a rotor magnet, preferably regions of island shape. In this case the rotor magnet is first fully magnetized in a magnetizing device in the heretofore conventional manner, for example in a device like the device 90 of FIGS. 7 and 8, but one in which there are no cavities 97, so that a trapezoidal magnetization profile like graph (A) of FIG. 6 is produced overall.

The demagnetizing device 106 according to FIG. 11 has a magnet core 107 with four legs 108, each of which carries a winding 109 of the same size, i.e., having an equal number of turns. These windings are connected so as to provide alternating polarity, and they may be connected in parallel or in series (the latter being shown in FIG. 11).

When current is then caused to flow through all these windings, an array of alternating north and south poles is produced at the outer boundaries of the legs 108, this being shown with the usual symbols N and S in FIG. 11.

Figure 12:
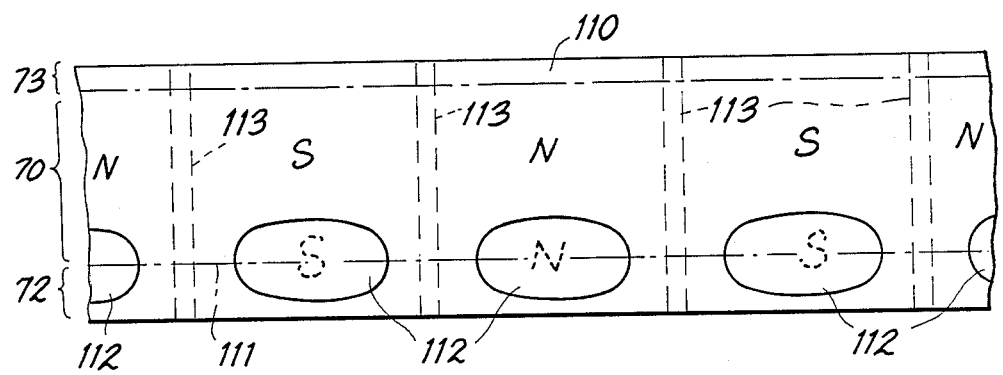
FIG. 12 is a developed view of a four-pole external rotor magnet in which island-like regions of reduced magnetization are provided.

The device 106 of FIG. 11 is then put within a previously magnetized rotor magnet 110 so that, as shown in FIG. 12, the centers of the legs are substantially opposite the boundary line 111 between the lower extension region 72 and the motor (air gap) region 70 of the rotor. A shot of current is then dispatched through the four windings 108 so that four insular regions 112 are produced in the magnet 110 which have a well defined reduced magnetization. These islands of reduced magnetization are partly in the lower extension region 72 and partly in the motor region 70, but they all maintain spacing from the pole gaps 113 and likewise from the lower edge of the rotor magnet 110. In this manner, the following important advantages are obtained:

(a) By the demagnetization of the previously magnetized rotor magnet 110, there is provided overall a very stable magnetization in the insular regions 112 which changes very little in service.

(b) The control of a Hall IC by the extension region 72 is not at all impaired.

(c) The axial thrust 74 (FIG. 1) is greatly reduced, so that sleeve bearings can be used for the rotor bearings.

(d) The desired saddles or dips 80 in the induced voltage shown in graph (A) of FIG. 9 are produced and thereby the desired more uniform current flow.

The aspect of the invention regarding the saddles or dips 80,80' in the induction characteristic and their advantageous effects is not limited to motors that have a cylindrical air gap and which as a result are subject to the generation of an axial thrust.

Figure 13:
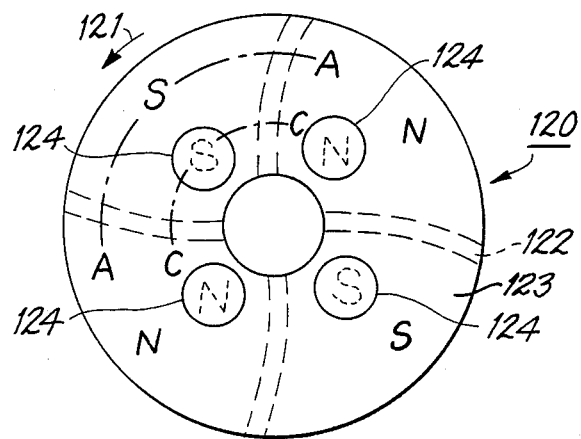
FIG. 13 is a plan view of a permanent magnet rotor according to the invention for a flat air gap brushless d.c. motor.

FIG. 13, for example, shows in plan view a four-pole rotor magnet 120 for a flat motor, such as is shown for example in FIGS. 1 to 4 or 20 to 22 of U.S. Pat. No. 3,840,761, which patent is referred to here to avoid unnecessary length in this description. The direction of rotation is indicated at 121 in FIG. 13, and the slightly spiral-shaped pole gaps are shown at 122. The magnetization pattern along the circular line A—A corresponds to the representation in the top graph (A) of FIG. 6 and the magnetization profile along the curve line C—C of FIG. 13 corresponds to the profile shown in the middle graph (B) of FIG. 6. This last result is obtained by partly demagnetizing an insular region 124 in each pole 123. The induced voltage then has the form illustrated in graph (A) of FIG. 9 with the saddles 80,80'. Of course, in the case of the rotor magnet 120 according to FIG. 13, instead of a large region 124 in each pole, several smaller regions of corresponding aggregate size and position can be magnetized more weakly or, after previous conventional magnetizing, can be partly demagnetized. What is significant is the profile of the induced voltage or of the desired "smooth" current flow without excessive peaks or valleys.

For obtaining this objective, corresponding cavities in the rotor magnet can, of course, be provided. If the rotor magnet for example is a so-called rubber magnet, which is to say a mixture of hard ferrite in powder form and an elastomer, such a magnet can be made less thick at the required places or can even be provided with perforations in order to obtain the desired shape of the induced voltage. It will therefore be recognized that a very large number of possible ways of constituting a rotor of the suitable magnetization are presented for accomplishing the practice of the invention. Furthermore, it is in no way necessary, although it is usually advantageous, to control such a motor by galvanomagnetic commutation means. The improvement of the shape of the induced voltage wave by the invention is equally favorable for motors with optoelectronic commutation or with high-frequency commutation.

As already mentioned, the invention is suitable also for motors with a pulse count other than two per 360° el. of revolution. In such cases, correspondingly more galvanomagnetic or other sensors must be provided, but all of these can be controlled from the same control track of the rotor magnet.

Reference is made to German published patent application (OS) No. 31 11 387 and the corresponding U.S. patent application Ser. No. 361,059, already referred to above, for a particularly useful electronic circuit for use in connection with control by a Hall IC.

Although the invention has been described with reference to particular illustrative examples and a number of possible modifications have already been mentioned, it will be understood quite generally that modifications and variations are possible within the inventive concept.

We claim:

1. Brushless d.c. motor having a stator (10) and a permanent magnet rotor (40) facing each other across a substantially cylindrical air gap (23), said stator including a lamination-stack core and conductor means thereon for energization by current pulses, said rotor having a first axially extending portion (72) extending beyond the stator for control of at least one galvanomagnetic sensor (30) located outside said air gap (23) for control thereof by the poles of said first axially extending rotor portion, said sensor being adapted for controlling the application to said conductor means of pulses energized by d.c., the poles of said rotor being distributed in the circumferential direction on the rotor and incorporating the improvement that the magnetization of said rotor, at least in said first axially extending portion, is constituted in a pattern providing regions of relatively weaker magnetization in the respective mid portions of the magnetic poles and regions of relatively stronger magnetization adjacent to said midportions and extending towards the boundaries (44,45) between adjacent magnetic poles.

2. Motor as defined in claim 1, in which said rotor has a second axially extending portion (73) at the axial extremity of said rotor opposite from the extremity provided by said first axially extending portion, likewise extending beyond said stator, and in which said first axially extending portion extends farther beyond said stator than said second axially extending portion extends.

3. Motor as defined in claim 2, in which the magnetization of said first axially extending portion (72) of said rotor (40) corresponds to the magnetization of the portion (70) of said rotor facing said stator so far as regards the polarity of the poles and the location of the interpole gaps (44,45).

4. Motor as defined in claim 3, in which said regions of relatively weaker magnetization (79,112) in said first axially extending portion (72) of said rotor (40) provided by said magnetization pattern extend into the portion (70) of said rotor facing said air gap (23) in a manner preserving their spacing from said interpole gaps (44,45).

5. Motor as defined in claim 4, in which said regions of relatively weaker magnetization (79) do not occupy more than 50% of the portion (70) of the rotor magnet surface which is adjacent to said air gap.

6. Motor as defined in claim 1, in which said regions of weaker magnetization are partly demagnetized regions of said rotor.

7. Motor as defined in claim 1, in which said regions of weaker magnetization are regions in which the radial thickness of the permanent magnet material of the rotor is less than that of said material in other regions of the rotor.

8. Motor as defined in claim 1, in which said regions of weaker magnetization (112) are constituted in the configuration of islands in the respective magnetic poles of said rotor.

9. Motor as defined in claim 8, in which the islands of weaker magnetization are centered in a region of the rotor adjacent to said first axially extending portion (72) thereof.

10. Motor as defined in claim 1, in which said regions of weaker magnetization (79,112) occupy between 10% and 90% of the total magnetizable surface of said first axially extending portion (72) of said rotor.

11. Motor as defined in claim 10, in which said regions of weaker magnetization (79,112) occupy between 40% and 60% of the total magnetizable surface of said first axially extending portion (72) of said rotor.

12. Motor as defined in claim 1, in which the permanently magnetized poles of said rotor are provided within a pot-shaped external rotor part (42) of said rotor and in which said first axially extending portion (72) of said rotor is located at the open end of said pot-shaped rotor part.

13. Motor as defined in claim 1, in which the magnetization of said rotor in its portion which is beyond the inner axial extremity of said regions of weaker magnetization has a circumferential magnetization profile of substantially trapezoidal ($B_{AA}$) wave shape having relatively narrow interpole transitions (44,45).

14. Motor as defined in any one of claims 1-13, in which said stator winding is associated with energizing circuits controlled by said sensor (30) of a type for causing said motor to operate as a two-pulse motor (7).

15. Motor as defined in any one of claims 1-13, in which said at least one sensor (30) is a Hall IC.

16. Motor as defined in any one of claims 1-13, in which said rotor is mounted for turning in a sleeve-type bearing (19,34,37).

17. Motor as defined in any one of claims 1-13, to which an axial-flow blower of relatively short axial length is affixed.

18. Brushless d.c. motor having a rotor equipped with a permanent magnet and a stator equipped with conductor means thereon and separated from said rotor by an air gap, and having rotor position sensing means for controlling the application to said conductor means of pulses energized by d.c., said rotor magnet (43) being magnetized in a pattern such that when the rotor is turned while the conductor means on said stator do not carry current, a voltage wave (83) is induced therein of alternating trapezoidal form modified by dips in the null direction (80,81) in the induced voltage in the respective roof portions of the alternating trapezoid.

19. Motor as defined in claim 18, in which a first portion of said rotor magnet (43; 110; 120) is magnetized, in profile perpendicular to the course of the interpole gaps, in accordance with a trapezoidal wave pattern providing relatively narrow transition regions constituting interpole gaps, while a second portion of said rotor is magnetized in a manner providing at least one region of weaker magnetization (79;112; 124) in each middle portion located between a pair of successive interpole gaps (44,45; 113; 122).

20. Motor as defined in claim 19, in which said regions of weaker magnetization (112;124) are regions of at least partial demagnetization.

21. Motor as defined in claim 19, in which said regions of weaker magnetization (112;124) are in the form of islands each within a surrounding region of stronger magnetization.

22. Motor as defined in claim 19, in which said regions of weaker magnetization do not extend over more than 50% of the rotor magnet surface portion (70) facing said air gap (23).

23. Brushless d.c. motor having a rotor equipped with a permanent magnet, a stator having conductor means thereon and separated from said rotor by an air gap, and rotor position sensor means for controlling the application to said conductor means of pulses energized by d.c., in which motor said rotor magnet (110, 120) is magnetized so that the distribution of magnetic flux around its angle of revolution has a substantially constant value in the middle angle-region of the poles, except for at least one zone (112, 120) of reduced magnetic flux in at least one pole, and has a value falling steeply to zero in a small angular region in the edge regions of the pole said middle angle-region of.

24. Motor as defined in claim 23, in which a magnetic flux sensor (30) is provided for control of current in said conductor means on said stator and said conductor means are provided with energizing currents controlled by said sensor of a type for causing said motor to operate as a two-pulse motor.

* * * * *